United States Patent [19]
Hartwig et al.

[11] Patent Number: 5,864,106
[45] Date of Patent: Jan. 26, 1999

[54] BATTERY DISCONNECT SWITCH FOR ELECTRIC VEHICLE

[75] Inventors: Kenneth Hartwig, Ortonville; Larry L. Neblett, Pinckney; Dean B. Clark, Clawson; Min Sway-Tin, Troy; Thomas E. Zielinski, China, all of Mich.

[73] Assignee: Chrysler Corporation, Auburn Hills, Mich.

[21] Appl. No.: 779,582

[22] Filed: Jan. 7, 1997

[51] Int. Cl.[6] .............................. H01H 3/00; H01H 13/20
[52] U.S. Cl. ............................................................ 200/17 R
[58] Field of Search ...................................... 200/1 R, 1 V, 200/16 R–16 E, 17 R, 18, 400, 401, 424, 425, 431, 501, 318, 337; 307/10.7

[56] References Cited

U.S. PATENT DOCUMENTS

| | | | |
|---|---|---|---|
| 3,060,284 | 10/1962 | Elliot | 200/16 R |
| 3,187,120 | 6/1965 | Akst | 200/16 R |
| 4,041,257 | 8/1977 | Yancey | 200/1 R |
| 4,410,775 | 10/1983 | Howard | 200/52 R |
| 4,798,968 | 1/1989 | Deem | 307/10.7 |

*Primary Examiner*—Michael L. Gellner
*Assistant Examiner*—Michael A. Friedhofer
*Attorney, Agent, or Firm*—Thomas G. Pasternak

[57] ABSTRACT

A battery disconnect switch is provided for breaking the conductive path in an electric vehicle comprising at least one conductor pin moveable between a conducting position and a non-conducting position. At least one spring is provided for biasing the conductor pin toward the non-conducting position. A surging mechanism moves the conductor pin to the conducting position and a locking mechanism holds the conductor pin in the conducting position against the bias of the spring. A release mechanism releases the locking mechanism allowing the bias of the spring to force the conductor pin to its non-conducting position.

17 Claims, 4 Drawing Sheets

BATTERY DISCONNECT SWITCH FOR ELECTRIC VEHICLE

BACKGROUND OF THE INVENTION

1. Technical Field

The present invention generally relates to electric vehicles and, more particularly, to a method and apparatus for breaking high electric current at high electric voltage under load.

2. Discussion

Electric vehicles commonly use a large battery pack for providing power to the motor for propelling the vehicle. The level of current in conventional electric vehicle battery packs is approximately equal to 400 amps at 400 volts. A number of safety features have been incorporated in to modem electric vehicles to minimize the potential of injury to operators, mechanics, and safety technicians from this current. For instance, the battery pack is often isolated within a tub disposed along the underbody of the vehicle to minimize high voltage/high current exposure. Furthermore, automatic electric contactors open up to remove power from the motor and isolate the current within the battery pack when the vehicle key is turned off.

While these safety features are generally effective, there is room for improvement in the art. For instance, it would be desirable to provide a manually operated battery to backup the automatic system for removing power from the motor and isolating it in the battery pack. It would also be desirable to provide a battery disconnect switch which is accessible to operators, mechanics and emergency personnel so that by moving the switch to an "off" position, they may have confidence that all power has been removed from the vehicle. It further is desirable to provide a battery disconnect switch which is easily recognizable as being in a power off state. Moreover, it is desirable to provide a battery disconnect switch which is capable of breaking the conductive path of the high voltage/high current of an electric vehicle under load while minimizing arcing between contact points.

It is generally known that at high levels of current, such as 400 amps, breaking the conductive path and thus the current flow requires quick action so that an arc between contact points does not form. If the conductive path is not broken quickly enough, the air between the contact points is ionized and begins to burn. An arc then forms between the contact points and travels with the contacts as they are separated. The high current will sustain the arc across the gap through the burning ionized air. The temperature in this region may approach 10,000° F., which may severely damage equipment or cause fires.

In a conventional gas burning automobile employing a standard 12 volt system, the level of current is relatively low and known knife-type switches can be effectively utilized to break the current flow under load. To accomplish this, an operator moves a lever from an "on" position to an "off" position to break the conductive path. In this case, the air between the contact points is not ionized and the current does not arc across the gap because the current is relatively low and does not arc as the contact points are separated.

However, conventional knife-type switches cannot break the conductive path in high voltage, high current systems such as the 400 volt/400 amp system of an electric vehicle since they are hand speed sensitive. An operator is physically unable to move the lever from its "on" position to its "off" position quickly enough to prevent the high current from ionizing the air between the contact surfaces. The high current quickly arcs and jumps across the gap.

SUMMARY OF THE INVENTION

The present invention provides a battery disconnect switch for breaking the conductive path in an electric vehicle comprising at least one conductor pin moveable between a conducting position and a non-conducting position. At least one spring is provided for biasing the conductor pin toward the non-conducting position. A surging mechanism moves the conductor pin to the conducting position and a locking mechanism holds the conductor pin in the conducting position against the bias of the spring. A release mechanism releases the locking mechanism allowing the bias of the spring to force the conductor pin to its non-conducting position.

DETAILED DESCRIPTION OF THE PREFERRED EMBODIMENTS

Figure 1:
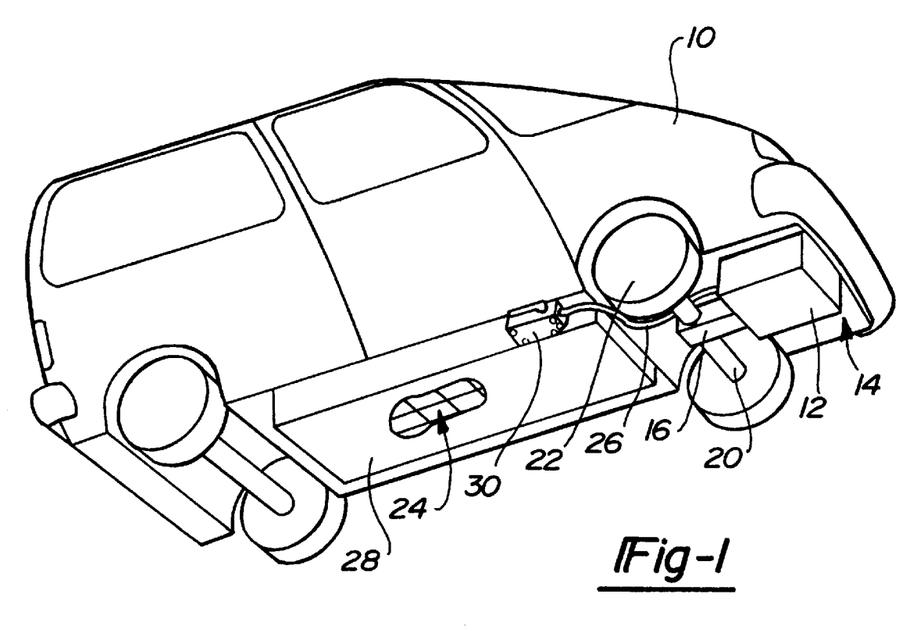
FIG. 1 is a perspective view of an electric vehicle including a motor, battery tub, and battery disconnect switch according to the present invention.

Turning now to the figures, an electric vehicle is shown in FIG. 1 including a battery disconnect switch according to the present invention indicated generally at 10. An electric motor 12 is mounted to the vehicle frame 14 at a forward end of the vehicle 10 in a known manner. The speed reducer 16 is operably coupled to a front transaxle 20 for driving a front wheel 22 of the electric vehicle 10. A battery pack 24 electrically powers with the electric motor 12 through a pair of high current, high voltage wires 26 which define a conductive path therebetween. The battery pack 24 is disposed within an enclosure or battery tub 28 which isolates the battery pack 24 from the remainder of the vehicle 10.

A battery disconnect switch 30 is secured to a forward part of a side wall of the battery tub 28 behind the front wheel 22 of the electric vehicle 10. The battery disconnect switch 30 is interposed along the high current, high voltage wires 26 extending from the battery pack 24 to the electric motor 12. As will be described in greater detail below, the battery disconnect switch 30 is operable to manually back up the automatic power off function of the electric vehicle 10 whereby all of the power is isolated within the battery tub 28. Also, the battery disconnect switch 30 serves to break the power flow from the battery pack 24 under load. It should be noted that the battery disconnect switch 30 can be located in a number of positions on the electric vehicle 10 without avoiding the scope of the present invention.

Figure 2:
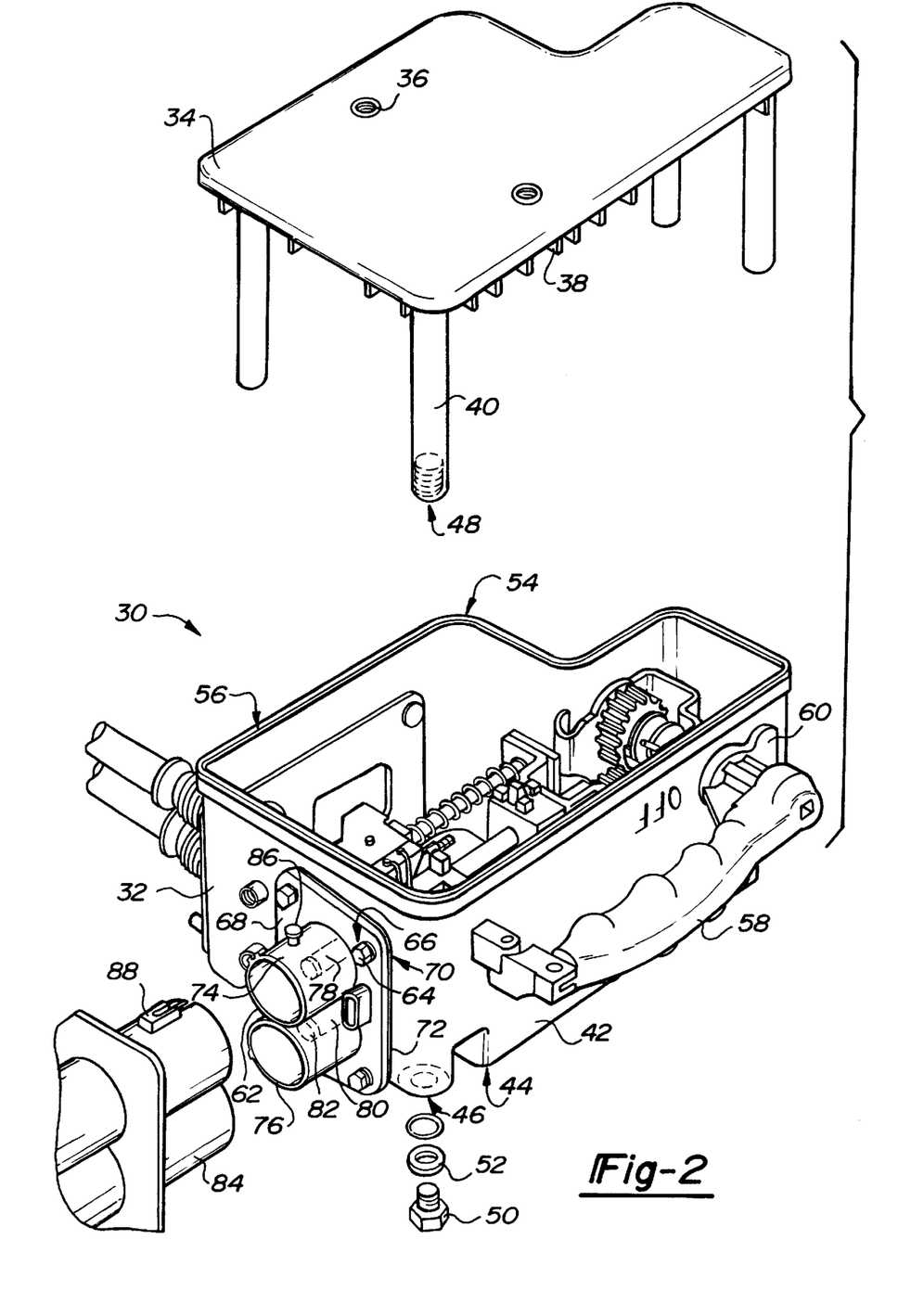
FIG. 2 ia a partially exploded view of a battery disconnect switch including a mechanism for breaking a conductive path through biased retraction of conductor pins according to the present invention.

Turning now to FIG. 2, the battery disconnect switch 30 is shown in a partially exploded view to expose the retraction mechanism of the present invention. The battery disconnect switch 30 includes a generally rectangular shaped housing 32 having a removable top 34 detachably mounted thereto. Preferably, the housing 32 is made from tough durable plastic material for withstanding impacts from road debris. The housing top 34 includes a pair of threaded openings 36 for receiving threaded members (not shown) associated with a "rock guard". The battery disconnect switch 30 can be provided with additional protection against damage caused by road debris striking the housing 32 by securing the rock guard to the top 34. The top 34 also includes a plurality of cross supports 38 extending therebetween for added stabilization.

A plurality of downwardly projecting posts, as represented by the post 40, extend from a bottom surface of the housing top 34. When the top 34 is positioned on the housing 32, the post 40 projects adjacent the interior of the housing side wall 42 to a housing bottom 44. A plurality of apertures, as represented by the aperture 46 are provided in the housing bottom 44 corresponding to the posts 40. The distal ends of the posts 40 include a threaded opening 48 which aligns with the apertures 46. A plurality of threaded members, as represented by the threaded member 50, pass through the apertures 46 to engage the threaded openings 48 of the post 40 to secure the top 34 to the housing 32. A plurality of washers 52 may be fitted along the threaded member 50 for spacing or locking the threaded member 50 to the housing bottom 44.

The housing top edge 53 is provided with a channel 54 suitably adapted to support a seal 56. The seal 56 is preferably constructed of a non-conductive material and functions under the pressure of the housing top 34 against the housing top edge 53. This is facilitated by engaging the threaded member 50 with the post 40. The housing top 34, seal 56, and housing top edge 53 cooperate to form a compression seal along the seam between the housing top 34 and the housing top edge 53 for weatherproofing the battery disconnect switch 30.

As described in greater detail below, a handle 58 is rotatably secured through the housing side wall 42 to the retraction mechanism disposed therein. A flange or cover 60 extends along the exterior of the housing side wall 42 from a proximal end of the handle 58. The cover 60 is attached to the handle 58 such that the cover 60 rotates from a first position to a second position as the handle 58 is rotated. The cover 60 functions to obstruct viewing of an "on" label when the handle 58 is in an off position and obstructs viewing of an "off" label when the handle 50 is in the on position. Therefore, an observer can quickly recognize the "on" or "off" state of the battery disconnect switch 30 by glancing at the handle 58 and observing the exposed "on" or "off" label.

A male power connector 62 is secured to a housing end wall 63 by a plurality of threaded members, represented by the threaded member 64, passing through a plurality of holes represented by the hole 66, formed in the male power connector base 68 and engaging a plurality of threaded apertures, represented by the aperture 70, formed in the housing end wall 63. A seal 72 formed of nonconductive material is pressure fit between the male power connector base 68 and the housing end wall 63 to prevent moisture from entering the battery disconnect switch 30.

The male power connector 62 includes a positive conductor pin chamber 74 and a negative conductor pin chamber 76 circumferentially surrounding a positive conductor pin 78 and a negative conductor pin 80 of the battery disconnect switch 30 respectively. An insulator tip 82, preferably formed of nylon, is secured to the distal end of both the positive and negative conductor pins 78, 80 for reducing ionization of the air around the conductor pins and subsequent arcing when the conductive path is broken under load as described elsewhere in this description.

The male power connector 62 is adapted to engage a female power conductor 84 disposed at an end of electric leads extending from the electric motor 12 of the electric vehicle 10. A pair of anchor posts 86 vertically projecting from the male power connector 62 engage corresponding slots 88 formed in extensions of the female power connector 84 to interlock the two power connectors 62, 84 together.

Figure 3:
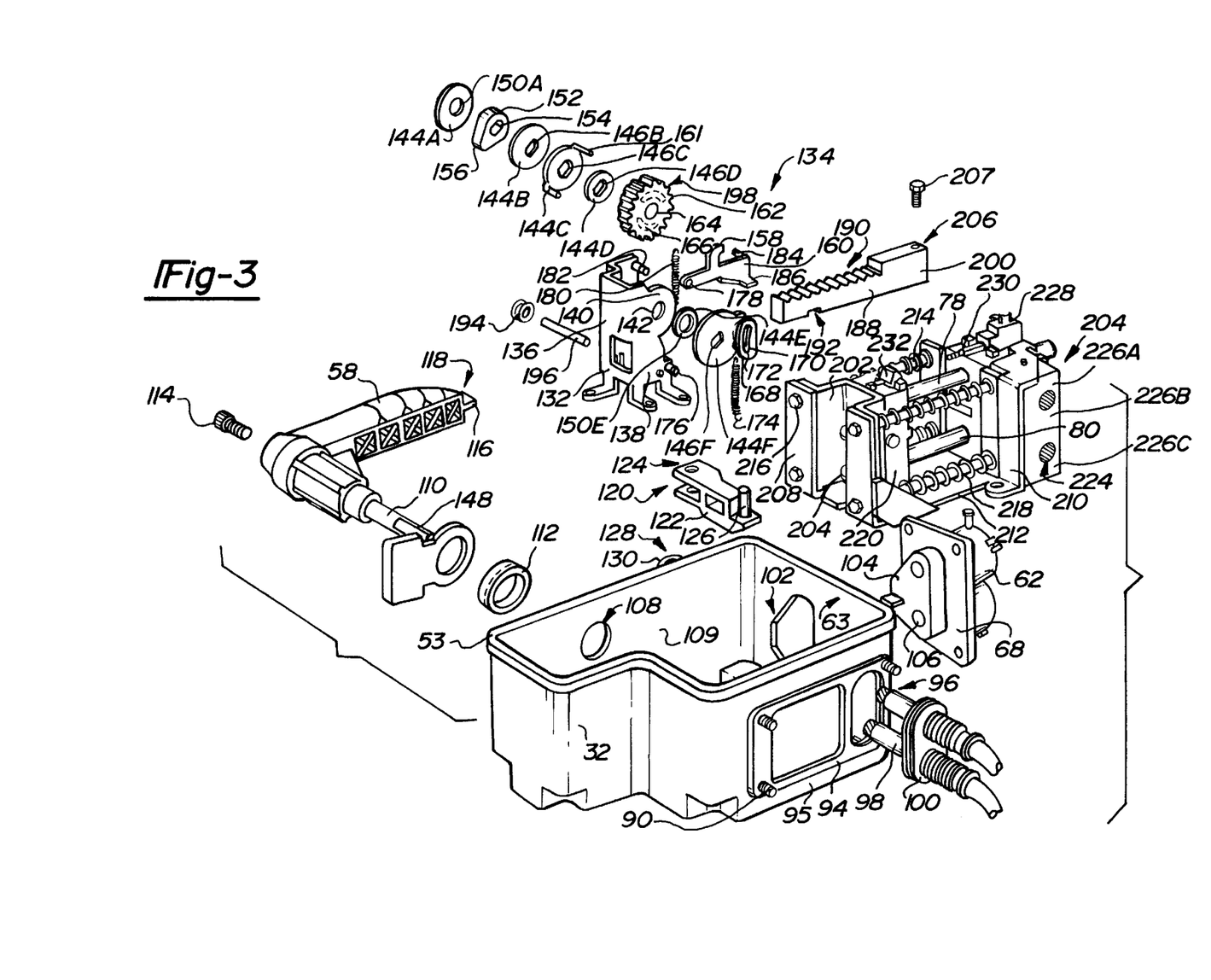
FIG. 3 is an exploded view of the battery disconnect switch assembly including the retraction mechanism, switch handle, and conductors according to the present invention.

Referring now to FIG. 3, the battery disconnect switch 30 is shown in an exploded view to expose the structure of the retraction mechanism. A plurality of threaded members, as represented by the threaded member 90, extend from the interior of the housing through the housing side wall. The threaded members 90 are adapted to engage corresponding threaded openings (not shown) in the battery tub. A brace is preferably disposed adjacent the interior of the housing side wall and is connected thereto by the threaded members 90 for added stability. Furthermore, a bottom support preferably extends adjacent the housing bottom 44.

A seal 94 formed of non-conductive material is positioned adjacent the housing side wall 95. The seal 94 includes a plurality of openings adapted to surround the threaded member 90. When the battery disconnect switch 30 is mounted to the battery tub 28, a press fit, compression seal is formed therebetween by the seal. An opening 96 is formed in the housing side wall 95 for accommodating a positive and negative lead 98 extending from the battery pack 28. A resilient seal 100 is located about the positive and negative leads 98 and flexibly connects with the periphery of the opening 96.

A generally triangular shaped aperture 102 is formed in a housing end wall 63 corresponding to a generally triangular shaped projection 104 extending from the male power connector base 68. The projection 104 includes a pair of conductor pin openings 106 for accommodating the positive and negative conductor pins 78, 80.

A circular opening 108 is provided in a housing side wall 109 for accommodating a handle central shaft 110. A donut shaped flexible seal 112 is disposed around the central shaft 110 and sealingly engages the periphery of the circular opening 108. A non-conductive threaded member 114 passes through the proximal end of the handle 58 and engages an end of the central shaft 110.

The handle 58 includes a lockout flange 116 having an aperture 118 therein extending from its distal end. The lockout flange 116 is adapted to slidingly engage a slot 120 formed in a removable lock-out device 122. The lockout flange aperture 118 aligns with a pair of apertures 124 in the lock-out device 122 when the handle 58 is in an off position. A padlock or pin (not shown) can be inserted through the aligned lockout apertures 124 and flange aperture 118 to prevent the handle 58 from being rotated. The lock-out device 122 includes a post 126 which is adapted to couple with an opening 128 in a flange 130 laterally projecting from the housing side wall 109.

A gear and rack mount 132 is secured to the housing bottom 44 or bottom bracket (not shown) for supporting a gear and rack assembly generally indicated at 134. The gear and rack mount 132 includes a rear wall 136 and a pair of oppositely disposed mount side walls 138. Each mount side wall 138 includes a circular projection 140 extending therefrom. Each circular projection 140 includes an aperture 142 for supporting the handle central shaft 110.

The gear and rack assembly 134 and handle central shaft 110 cooperate to support a plurality of washers 144 A–F.

Preferably, the washers 144 A–D are located along the handle central shaft 110 between the gear and rack mount side walls 108 and the washers 144 E and F are located on an outboard side of the gear and rack mount 132. The washers 144 B–D, and F are operably mounted on the handle central shaft 110 by sliding the partially truncated circular openings 146 B–D and F over the partially truncated cylindrical central portion 148 of the handle central shaft 110. The washers 146 B–D and F are therefore rotated as the handle 58 is rotated. The washers 144 A and E are mounted on the handle central shaft 110 by passing the shaft 110 through the openings 150 A and E.

A cam 152 is operably disposed along the handle central shaft 110 between the washers 144 A and B. The cam 152 includes a partially truncated circular opening 154 operatively engaging the truncated cylindrical portion 148 of the handle central shaft 110. The cam 152 also includes a camming surface 156 for engaging an arcuate portion 158 of a latch 160, described in greater detail below, when the handle 58 is rotated from an on position to an off position.

The washer 144C includes a pair of oppositely disposed axially projecting flanges 161 for rotating a gear 162. The gear 162 is mounted along the handle central shaft 110 between the gear and rack mount side walls 138 by passing the shaft 110 through the gear opening 164. The gear includes a pair of slots 166 extending partially along the interior of its circumference for receiving the washer flanges 161 therein. The washer flanges 161 cooperate with the slot ends to transfer rotation of the handle 58, through the handle shaft 110 and washer 144C to the gear 162. The slotted configuration allows the handle 58 to rotate over a predetermined distance prior to rotating the gear 162.

The washer 144F is secured to the distal end of the handle central shaft 110 and is preferably spot welded or otherwise fixed thereto by conventional means. The washer 144F includes a flange 168 extending therefrom configured to overhang an edge of the washer 144F. The washer 144F and flange 168 include parallel slots 170 which slidingly engage a shaft 172. A handle spring 174 is coupled at a first end to the shaft 172 disposed within the slots 170. The handle spring 174 is coupled at a second end to a post 176 laterally projecting from the gear and rack mount side wall 138. The shaft 172 and post 176 preferably include a groove formed about their circumference defining a recess for engaging a hook-shaped first and second end of the handle spring 174.

The slot 170, shaft 172, and handle spring 174 cooperate to form an over center spring system for the handle 58. When the handle 58 is in an off position, the handle spring 174 forces the shaft 172 to a first end of the slot 170 and biases the handle 58 in an off direction. When the handle 58 is in an on position, the handle spring 174 forces the shaft 172 against a second end of the slot 170 and biases the handle 58 in an on direction.

The latch 160 is journally supported a proximal end to the gear and rack mount side wall 138 by rotatably engaging a latch aperture 178 with a latch post (not shown) laterally projecting inboard from the gear an rack mount side wall 138. A latch spring 180 is coupled at a first end to a latch anchor 182 laterally projecting from the gear and rack mount side wall 138. The second end of the latch spring 180 is coupled to a latch pin 184 laterally extending from a distal end of the latch 160. Preferably, the latch anchor 182 and latch pin 184 include a circumferential groove defining a recess for engaging a hook-shaped first and second end of the latch spring 180. The latch spring 180 exerts a force on the distal end of the latch 160 which biases the latch 160 in an upward direction.

The latch 160 also includes the vertically projecting generally arcuate surface 158. The arcuate surface 158 aligns adjacent the camming surface 156 of the cam 152. In this way, the cam 152 pushes against the arcuate surface 158 via the camming surface 156 as the handle 58 is rotated. The interaction of the cam 152 and the arcuate surface 158 drives the latch 160 in a downward direction, overcoming the bias of the latch spring 180. A rack dog 186 projects from the latch 160 in a plane normal to the arcuate surface 158.

A rack 188 having a plurality of teeth 190 formed thereon is movably supported within the gear and rack mount 132. A spindle 194 rotatably mounted on a rod 196 is disposed between the gear and rack mount side walls 138 for journally supporting the rack 188. The rack teeth 190 are configured to meshingly engage the plurality of teeth 198 disposed about the circumference of the gear 162. As the gear 162 is rotated by the handle 58, the rack 188 is driven in a translational direction. The rack 188 also includes a notch 192 formed in a bottom surface adapted to engage the latch dog 186.

The rack 188 is connected at a first end 200 to a movable plate 202 comprising part of a retraction assembly 204. The first end 200 of the rack 188 is interposed between first and second rack mounting flanges 204 extending form the movable plate 202. The first end includes an aperture 206 which aligns with apertures (not shown) in the rack mounting flanges 204. A pin or screw 207 interconnects the apertures 206, 204 to secure the rack 188 to the movable plate 202.

The retraction assembly 204 also includes a first stationary plate 208 oppositely disposed from a second stationary plate 210. The first and second stationary plates 208, 210 are preferably upwardly turned ends of a main or base plate 212. The base plate 212 is mounted to the housing bottom 44 or bottom bracket in the housing 32 to provide support for the retraction assembly 204.

A plurality of guide posts, as represented by the guide post 214, longitudinally extend between the first and second stationary plates 208, 210. A first end of the guide post 214 is coupled to the first stationary plate 208 and a second end of the guide post 214 is coupled to the second stationary plate 210. Preferably, the guide post 214 comprises an elongated member having a head 216 at a first end and threads at a second end. Even more preferably, the guide post passes through an aperture formed in the first stationary plate 208 and engages a threaded opening in the second stationary plate 210. Washers or similar spacers may be interposed between the guide post head 216 and the first stationary plate 208 if desired.

The movable plate 202 is disposed adjacent the first stationary plate 208 and includes a plurality of openings therein for receiving the guide posts 214. The movable plate 202 is adapted to slide along the guide posts 214 between the first stationary plate 208 and the second stationary plate 210 under the force of the rack 188 and a plurality of springs. The plurality of springs, as represented by the spring 218, are concentrically disposed about the guide posts 214 between the movable plate 202 and the second stationary plate 210. The first end of the springs 218 abut the movable plate 202 while the second end of the springs 218 abut the second stationary plate 210. In this way, as the movable plate 202 is propelled towards the stationary plate 210 by the rack 188, the springs 218 compress and exert a return force on the movable plate 202.

The positive and a negative conductor pins 78, 80 are coupled at a first end to an insulating mount 220 which is secured to the movable plate 202. The conductor pins 78, 80 pass through openings in an insulator assembly 222 disposed adjacent the second stationary plate 210. The conductor pins 78, 80 extend through the insulator assembly 222 and housing 32 into the male power connector 62. The movable plate 202 surges and retracts the conductor pins 78, 80 to and from the female power conductor 84 as it moves axially along the guide posts 214.

The insulator assembly 222 includes a pair of lateral openings 224 adapted to receive the positive and negative leads 98 from the battery pack 28. Preferably, the lateral openings 222 comprise a rad socket type conductor so that the conductor pins 78, 80 are in constant electrical contact with the positive and negative leads 98 in both a surged and a retracted state. The insulator assembly 222 includes horizontally disposed insulators 226 A–C. This arrangement prevents electric current from tracking along the insulator interface between the positive and negative leads 92.

A low voltage switch 228 is disposed atop the insulator assembly 222 and includes a push type actuator 230. The insulating mount 220 includes a low voltage switch activator 232 slidingly disposed within a holder and biased in a forward direction. The activator 232 pushes against the actuator 230 to close the low voltage switch 228 and provide low voltage current through a pilot line when the movable plate 202 is located at its forward most position. The pilot line electronically communicates with a display device to indicate the on or off state of the battery disconnect switch 30.

Figure 4:
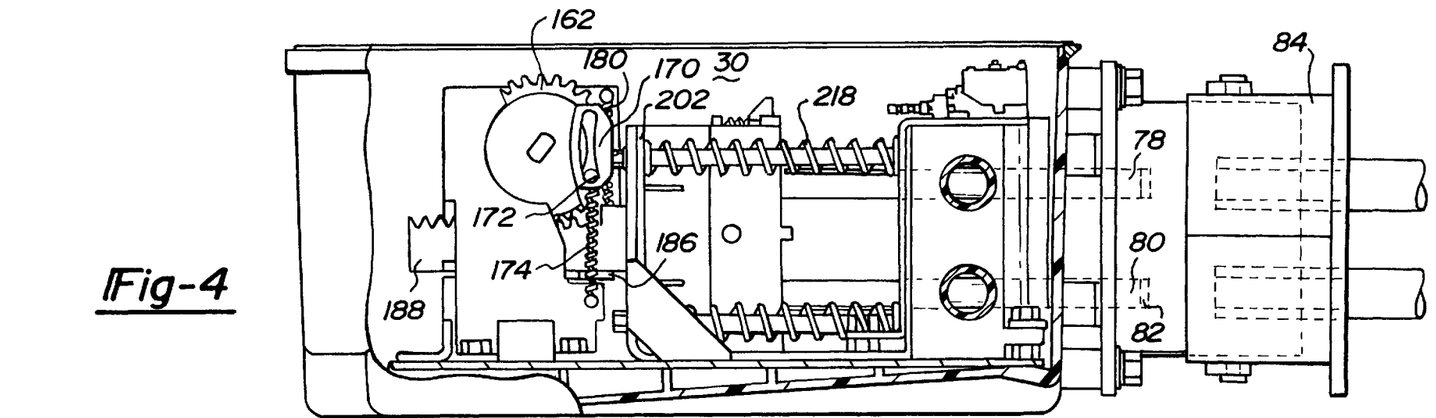
FIG. 4 is a side elevational view of a battery disconnect switch in cross-section in a released, power off state according to the present invention.
Figure 5:
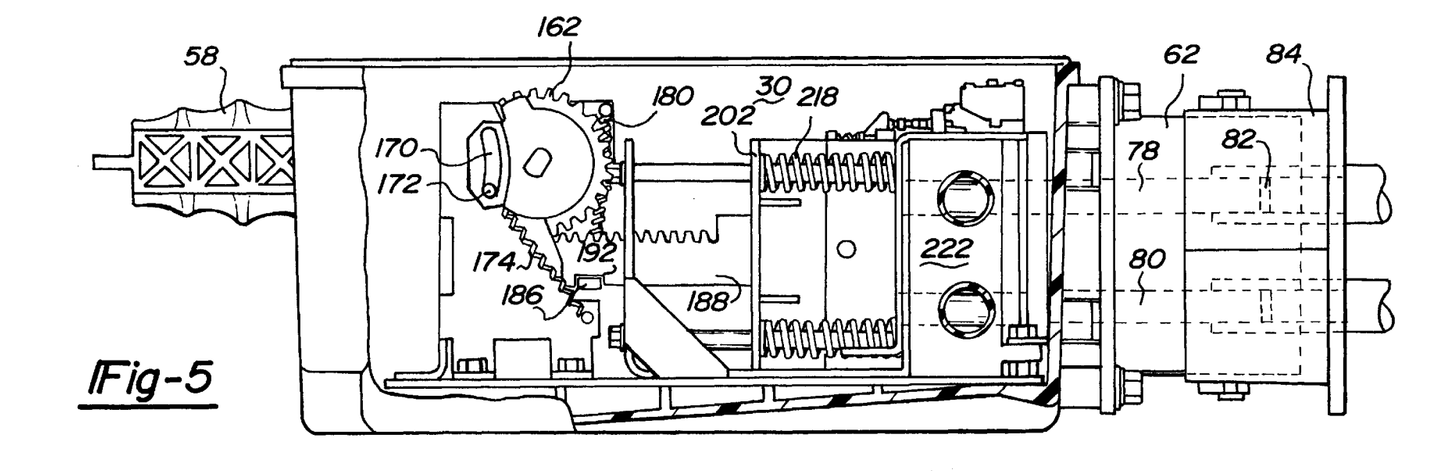
FIG. 5 is a elevational view of a battery disconnect switch in cross-section in a biased, power on state according to the present invention.

Turning now to FIGS. 4 and 5, the battery disconnect switch 30 is shown in its on and off states. Referring specifically to FIG. 4, the battery disconnect switch 30 is shown in an off state. In this state, the gear 162 meshingly engages the rack 188 near its first end 200. The rack 188 is forced to its rearward most position by the springs 218. Also, the shaft 172 is forced against the first end of the slot 170 under the bias of the spring 174 to bias the handle 58 in an off direction.

The movable plate 202 is forced adjacent the first stationary plate 208 and is held there under the bias of the plurality of springs 218. The conductor pins 78, 80 are in a retracted position and do not electrically contact the rad sockets of the female power connector 84 leading to the electric motor. The latch dog 186 is riding on the bottom surface of the rack 188 and is biased upward under the pressure of the latch spring 180. As can be seen, the conductive path is broken within the male power connector 62 exterior of the housing 32 and not within the insulator assembly 222.

Turning now to FIG. 5, the battery disconnect switch 30 is shown in its on state. The plurality of springs 218 are compressed by the movable plate 202 which is held in a forward position by the engagement of the latch dog 186 with the rack notch 192. In this state, the shaft 172 is forced against the second end of the slot 170 under the force of the latch spring 174 to bias the handle 58 in an on direction. The conductor pins 78, 80 extend through the insulator assembly 222 and forward in the male power conductor 62 to electrically contact the female power conductor 84. In the on state, current flows from the battery pack 28 through the conductor pins 78, 80 to the electric motor 12.

When the handle 58 is rotated from an off position to an on position the gear 162 forces the rack 188 and moveable plate 202 to a forward most position. When in this position, the latch spring 180 forces the latch dog 186 upward to engage the notch 192. The interaction of the latch dog 186 and notch 192 holds the rack 188 in a forward most position against the pressure of the plurality of springs 218. When the handle 58 is rotated from the on position towards the off position, the cam 156 forces the latch 160 downward and removes the latch dog 186 from the notch 162. The moveable plate 202 and rack 188 are subsequently forced rearward by the force of the springs 218. The movable plate 202 retracts the conductor pins 78, 80 from electrical contact with the female power conductor 84.

To break the current under load, it is necessary to quickly retract the conductor pins 78, 80 from the female power conductor 84. The springs 218 retract the conductor pins 78, 80 from the female power conductor 84 so quickly that the current minimally ionizes the air between the nylon tips 82 and the rad sockets of the female power conductor 82. Therefore, minimal arcing occurs.

Thus, the present invention provides a manually operated battery disconnect switch for backing up the automatic power disconnect system of an electric vehicle. Additionally, the battery disconnect switch is accessible to operators, mechanics, and emergency personnel who can remove the power from the electric vehicle by moving the handle to an off position. Furthermore, a battery disconnect switch is provided which is capable of breaking the conductive path of the high current/high voltage of an electric vehicle under load while minimizing arcing between contact points.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A disconnect switch comprising:
   at least one conductor pin moveable between a conducting position and a non-conducting position;
   at least one spring in operable relationship with said at least one conductor pin for biasing said at least one conductor pin toward said non-conducting position;
   a locking mechanism for holding said at least one conductor pin in said conducting position against said bias of said at least one spring; and
   a surging mechanism for moving said at least one conductor pin to said conducting position, said surging mechanism including;
   a handle;
   a gear coupled to said handle; and
   a rack meshingly engaging said gear, said rack being operably secured to said at least one conductor pin.

2. The disconnect switch of claim 1 further comprising:
   a release mechanism for releasing said locking mechanism.

3. The disconnect switch of claim 2 wherein said release mechanism further comprises:
   said handle; and
   a cam coupled to said handle operatively engaging said locking mechanism.

4. The disconnect switch of claim 1 further comprising:
   a retracting mechanism including said at least one spring for moving said at least one conductor pin to said non-conducting position.

5. The disconnect switch of claim 4 wherein said retracting mechanism further comprises:
   a plurality of guide posts;

a plurality of springs concentrically disposed about said guide posts; and a movable plate in operable relation with said plurality of springs and slidingly coupled to said guide posts, said moveable plate being operably secured to said at least one conductor pin.

6. The disconnect switch of claim 1 wherein said at least one conductor pin further comprises:

a positive conductor pin; and a negative conductor pin.

7. The disconnect switch of claim 1 wherein said locking mechanism further comprises:

a removable latch engaging a surging mechanism operable for moving said at least one conductor pin to said conducting position.

8. The disconnect switch of claim 1 further comprising:

a first stationary plate;

a second stationary plate disposed opposite said first stationary plate;

a plurality of guide pins extending between said first stationary plate and said second stationary plate;

a moveable plate disposed between said first stationary plate and said second stationary plate, and along said plurality of guide pins;

said at least one conductor pin being coupled at a first end to said moveable plate; and a plurality of springs concentrically disposed about said guide pins exerting a force on said moveable plate at a first end and exerting a force on said second stationary plate at a second end.

9. A battery disconnect switch for breaking the conductive path of high current in an electric vehicle comprising:

a housing;

a top removably secured to said housing;

a handle rotatable between an on position and an off position secured to said housing;

a lockout flange extending from said handle;

a lockout device removably connected to said flange for preventing said handle from rotating;

an overcenter spring mechanism coupled to said handle for biasing said handle towards said first position when said handle is in said first position and operable for biasing said handle towards said second position when said handle is in said second position;

a power connector secured to said housing;

a positive conductor pin extending from an interior of said housing into said power connector;

a negative conductor pin extending from an interior of said housing into said power connector;

a gear coupled to said handle such that rotation of said handle rotates said gear;

a rack meshingly engaging said gear such that rotation of said gear translates said rack;

a latch removably engaging a notch in said rack;

a cam coupled to said handle, said cam being operable for removing said latch from said notch;

a first stationary plate disposed opposite a second stationary plate supporting a plurality of guide posts therebetween;

a plurality of springs concentrically disposed about said guide pins;

a moveable plate slidingly mounted on said guide pins, said moveable plate being secured to said rack;

said plurality of springs exerting a force on said moveable plate and on said second stationary plate;

an insulator mount secured to said moveable plate, said insulator mount being secured to said positive conductor pin and said negative conductor pin; and an insulator assembly having a plurality of insulators horizontally disposed therein adjacent said second stationary plate receiving said positive conductor pin and said negative conductor pin therethrough.

10. The battery disconnect switch of claim 9 further comprising:

a rock guard removably secured to said top.

11. The battery disconnect switch of claim 9 further comprising:

a means for displaying an on or off state of said battery disconnect switch.

12. The battery disconnect switch of claim 9 further comprising:

an insulator tip secured to an end of said positive conductor pin; and an insulator tip secured to an end of said negative conductor pin.

13. A disconnect switch comprising:

at least one conductor pin moveable between a conducting position and a non-conducting position;

at least one spring in operable relationship with said at least one conductor pin for biasing said at least one conductor pin toward said non-conducting position;

a locking mechanism for holding said at least one conductor pin in said conducting position against said bias of said at least one spring;

an insulating mount disposed at a first end of said at least one conductor pin;

a moveable plate coupled to said insulating mount;

at least one guide slidingly engaging said moveable plate and operable for axially guiding said moveable plate; and an insulator assembly receiving said at least one conductor pin.

14. The disconnect switch of claim 13 wherein said insulator assembly comprises:

a first insulator;

a second insulator disposed atop said first insulator;

a third insulator disposed atop said second insulator;

a first rad socket disposed at an interface of said first insulator and said second insulator; and a second rad socket disposed at an interface of said second insulator and said third insulator.

15. A disconnect switch comprising:

at least one conductor pin moveable between a conducting position and a non-conducting position;

at least one spring in operable relationship with said at least one conductor pin for biasing said at least one conductor pin toward said non-conducting position;

a locking mechanism for holding said at least one conductor pin in said conducting position against said bias of said at least one spring;

a handle rotatable between a first position and a second position;

a gear coupled to said handle such that rotation of said handle rotates said gear;

a rack meshingly engaging said gear such that rotation of said gear translates said rack;

a first stationary plate disposed opposite a second stationary plate supporting a plurality of guide posts therebetween;

a plurality of springs concentrically disposed about said guide pins;

a moveable plate slidingly engaging said guide pins, said moveable plate being secured to said rack;

said plurality of springs exerting a force on said moveable plate and on said second stationary plate;

an insulator mount secured to said moveable plate, said insulator mount being secured to said at least one conductor pin;

a latch removably engaging a notch in said rack; and a cam coupled to said handle, said cam being operable for removing said latch from said notch.

16. The disconnect switch of claim 15 further comprising:

a lockout flange extending from said handle; and a lockout device removably connected to said flange for preventing said handle from rotating.

17. The disconnect switch of claim 15 further comprising:

an overcenter spring mechanism coupled to said handle for biasing said handle towards said first position when said handle is in said first position and operable for biasing said handle towards said second position when said handle is in said second position.

* * * * *